United States Patent
Murase

(10) Patent No.: US 10,124,751 B2
(45) Date of Patent: Nov. 13, 2018

(54) ELECTRONIC CONTROL UNIT

(71) Applicant: DENSO CORPORATION, Kariya, Aichi-pref. (JP)

(72) Inventor: Yuuichi Murase, Kariya (JP)

(73) Assignee: DENSO CORPORATION, Kariya (JP)

(*) Notice: Subject to any disclaimer, the term of this patent is extended or adjusted under 35 U.S.C. 154(b) by 45 days.

(21) Appl. No.: 15/298,299

(22) Filed: Oct. 20, 2016

(65) Prior Publication Data

US 2017/0113636 A1 Apr. 27, 2017

(30) Foreign Application Priority Data

Oct. 21, 2015 (JP) .................. 2015-207192

(51) Int. Cl.
B60R 16/023 (2006.01)
(52) U.S. Cl.
CPC ............... B60R 16/0231 (2013.01)
(58) Field of Classification Search
CPC .................................... B60R 16/0231
See application file for complete search history.

(56) References Cited

U.S. PATENT DOCUMENTS

| | | | |
|---|---|---|---|
| 2004/0080997 A1* | 4/2004 | Okada | G11C 7/24 365/200 |
| 2005/0134440 A1* | 6/2005 | Breed | B60N 2/2863 340/435 |
| 2009/0254243 A1* | 10/2009 | Uchihashi | G05B 21/02 701/31.4 |

* cited by examiner

Primary Examiner — Yuen H Wong
(74) Attorney, Agent, or Firm — Posz Law Group, PLC

(57) ABSTRACT

An Electronic Control Unit (ECU) includes a diagnosis control request calculator, a power controller, a vehicle behavior monitor and the like. The ECU performs an auto-drive of a vehicle, during which a vehicle power source is controlled by the ECU for improving a rate achieve ratio of a fault diagnosis item. The ECU obtains vehicle information from a drive support ECU, a navigation device and the like. The ECU performs a control for improving a rate achieve ratio during the auto-drive. The ECU ranks the diagnosis items by the rate achieve ratios, i.e., from a low achiever diagnosis item toward a high achiever diagnosis item. The rate achieve ratio of the low achiever diagnosis item is improved by the ECU, by changing a controllable-state detection condition within a detection condition range.

12 Claims, 12 Drawing Sheets

| DIAG ITEM NAME \ DIAG RATE | CURRENT DIAG RATE | MINIMUM REQ. RATE | RATE ACHIEVE RATIO |
|---|---|---|---|
| CATALYST DEGRADE | 0.17 | 0.336 | 0.5 |
| 2ND AIR SYS PUMP OFF-ADHESION | 0.195 | 0.260 | 0.75 |
| EGR DIAG | 0.27 | 0.336 | 0.8 |
| ... | ... | ... | ... |

FIG. 2

| DIAG RATE<br>DIAG ITEM NAME | CURRENT DIAG RATE | MINIMUM REQ. RATE | RATE ACHIEVE RATIO |
|---|---|---|---|
| CATALYST DEGRADE | 0.17 | 0.336 | 0.5 |
| 2ND AIR SYS PUMP OFF-ADHESION | 0.195 | 0.260 | 0.75 |
| EGR DIAG | 0.27 | 0.336 | 0.8 |
| ... | ... | ... | ... |

FIG. 4

| CONTROLLABLE STATE<br>CONTROL INFO | THROTTLE OPEN DEG. | GEAR RATIO | AIR FUEL RATIO | ENG. ROT. NUMBER | |
|---|---|---|---|---|---|
| CHANGE AMOUNT REQUIRED FOR ACCEL. | +2° | SHIFT UP BY ONE GEAR | +0.2 | +200rpm | ... |
| CHANGE AMOUNT REQUIRED FOR DECEL. | -2° | SHIFT DOWN BY ONE GEAR | -0.2 | -200rpm | ... |
| POST-ACCEL/DECEL PROHIBITION TIME | 500ms | 1s | 500ms | 500ms | |

FIG. 3

| DIAG ITEM NAME \ STATE | THROTTLE OPEN DEG. | GEAR RATIO | AIR FUEL RATIO | ENG. ROT. NUMBER | ... | SUCTION AIR TEMP | ENGINE COOLANT TEMP | ATMOS. PRESSURE | ... |
|---|---|---|---|---|---|---|---|---|---|
| CATALYST DEGRADE | 30° – 40° | 3 OR ABOVE | 13.5 – 15.5 | 1500 – 3000rpm | ... | -10°C OR ABOVE | 70°C OR ABOVE | 75kPa OR ABOVE | ... |
| 2ND AIR SYS PUMP OFF-ADHESION | 15° OR ABOVE | N/A | N/A | 550rpm OR ABOVE | ... | N/A | 60°C OR ABOVE | 75kPa OR ABOVE | ... |
| EGR FLOW SHORTAGE | LESS THAN 1° | N/A | N/A | 1500rpm OR ABOVE | ... | -10°C OR ABOVE | 75°C OR ABOVE | 75kPa OR ABOVE | ... |
| ... | ... | ... | ... | ... | ... | ... | ... | ... | ... |

CONTROLLABLE STATES | UNCONTROLLABLE STATES

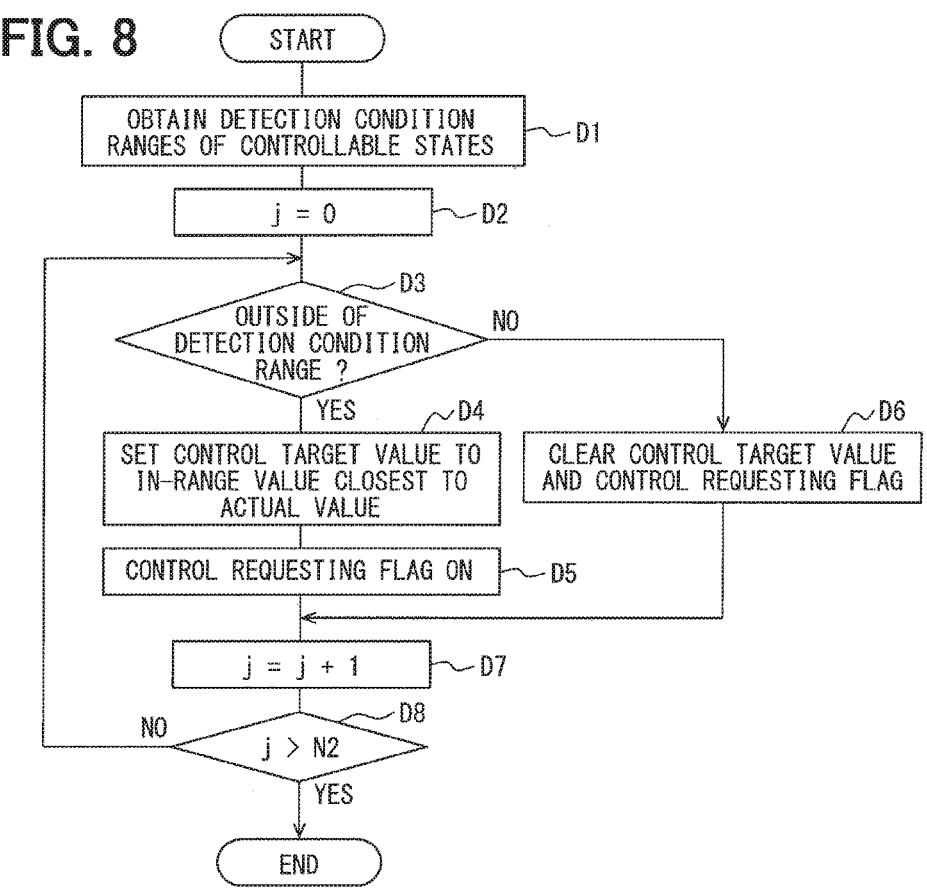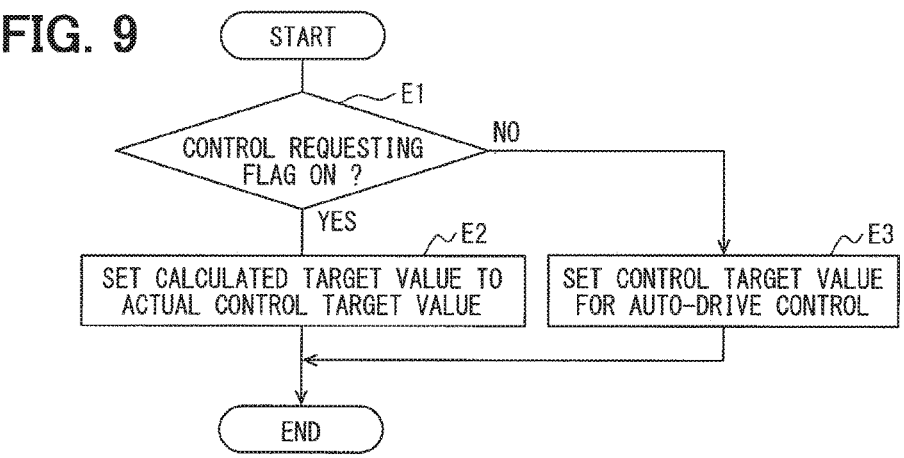

ELECTRONIC CONTROL UNIT

CROSS REFERENCE TO RELATED APPLICATION

The present application is based on and claims the benefit of priority of Japanese Patent Application No. 2015-207192, filed on Oct. 21, 2015, the disclosure of which is incorporated herein by reference.

TECHNICAL FIELD

The present disclosure generally relates to a diagnosis rate improvement function of an electronic control unit.

BACKGROUND INFORMATION

The fault diagnosis device for performing a fault diagnosis of a vehicle uses a technique, in which the actuator in the vehicle is forcefully operated for monitoring purpose when a diagnosis detection condition is satisfied. In such case, how the diagnosis of a certain diagnosis item has been performed is measured and monitored as a diagnosis rate, i.e., the number of diagnoses performed per trip counts, regarding which a trip is counted as a period between a start of the vehicle's power (e.g., an engine) and the next start.

Further, the minimum requirement rate is set by regulations as the diagnosis rate of certain diagnosis items, e.g., the regulated minimum requirement rate of 0.336 means that, the subject diagnosis item has to be diagnosed at least 336 times in 1000 trips.

The minimum requirement rate is set mostly for the system diagnosis items. The detection condition of the system diagnosis items tends to have many assumptions, that means prerequisites or in-advance "must conditions", such as an engine rotation number and/or an opening degree of a throttle valve have to be in a specific range continuously for a certain period of time, which may sometimes be very difficult to satisfy, depending on how the vehicle/engine is driven.

Further, the diagnosis items with the regulated minimum requirement rate may increase in the future, and new or different diagnosis detection conditions that are more difficult to satisfy may be added. Furthermore, developing countries may newly adopt the regulations enforcing the minimum requirement rate for many diagnosis items. That is, the diagnosis may be more difficult to complete, in terms of achieving the minimum requirement rate for various diagnosis items.

In the above-described technique, a forceful operation of an actuator suitably enables diagnosis of certain diagnosis items. However, the satisfaction of the diagnosis detection condition(s) is not controlled in the above-described technique, i.e., the satisfaction is situation dependent, precarious, or is left in happy-go-lucky manner. That is, the satisfaction of the diagnosis detection condition(s) by the above-described technique may become more difficult in the future.

The following patent documents are listed as an example of the above-described technique.
(Patent document 1) JP 2004-164601 A
(Patent document 2) WO 2008/038741

SUMMARY

It is an object of the present disclosure to provide an electronic control unit that is capable of improving a diagnosis rate of a diagnosis item, especially for low rate achiever diagnosis items, by making satisfaction of the diagnosis detection condition of such diagnosis items less difficult.

In an aspect of the present disclosure, the electronic control unit includes a power controller performing an auto-drive via a control of a power source in a vehicle, and a calculation processor controlling the power controller by generating fault diagnosis related control information for the power controller. The calculation processor is configured to (i) obtain current rate information determined as a diagnosis rate of a number of fault diagnoses by a fault diagnosis device against a number of trips of the vehicle respectively for fault diagnosis items (ii) calculate, respectively for the fault diagnosis items, a rate achieve ratio as a ratio of a current diagnosis rate against a preset minimum requirement rate, and (iii) perform a detection condition setting process that sets the control information respectively for the diagnosis items, the setting of the control information by the detection condition setting process performed in an ascending order of the calculated rate achieve ratios respectively for the fault diagnosis items.

According to the above-described configuration, regarding the respective diagnosis items, the calculation processor can obtain the current rate information, can calculate the rate achieve ratio as a ratio of a current diagnosis rate against a regulated minimum requirement rate, for example, and, in an ascending order of the calculated rate achieve ratios of the diagnosis items, can set the "detection-condition-satisfying" control information for such diagnosis items by performing the detection condition setting process. That is, the low rate achiever diagnosis items are taken care of first in a prioritized manner, for satisfying the detection condition and for enabling the diagnosis.

Thus, the difficult-to-satisfy detection condition(s) of the low rate achiever diagnosis items may be more easily set for enabling the diagnosis of such diagnosis items, thereby providing more diagnosis opportunities and improving the rate achieve ratios for such diagnosis items.

BRIEF DESCRIPTION OF THE DRAWINGS

Objects, features, and advantages of the present disclosure will become more apparent from the following detailed description made with reference to the accompanying drawings, in which:

FIG. 2 is a diagram of relationship between a diagnosis item, a diagnosis rate of the diagnosis item, and a rate achieve ratio of the diagnosis item;

FIG. 3 is a diagram of detection conditions of the diagnosis items;

FIG. 4 is a diagram of control information in a controllable state;

FIG. 8 is a flowchart of a diagnosis request value calculation process;

FIG. 9 is a flowchart of a request mediation process;

DETAILED DESCRIPTION

Hereafter, the embodiment of the present disclosure is described with reference to FIGS. 1-14. In the following description, a self-diagnosis is designated as a diagnosis.

Figure 1:
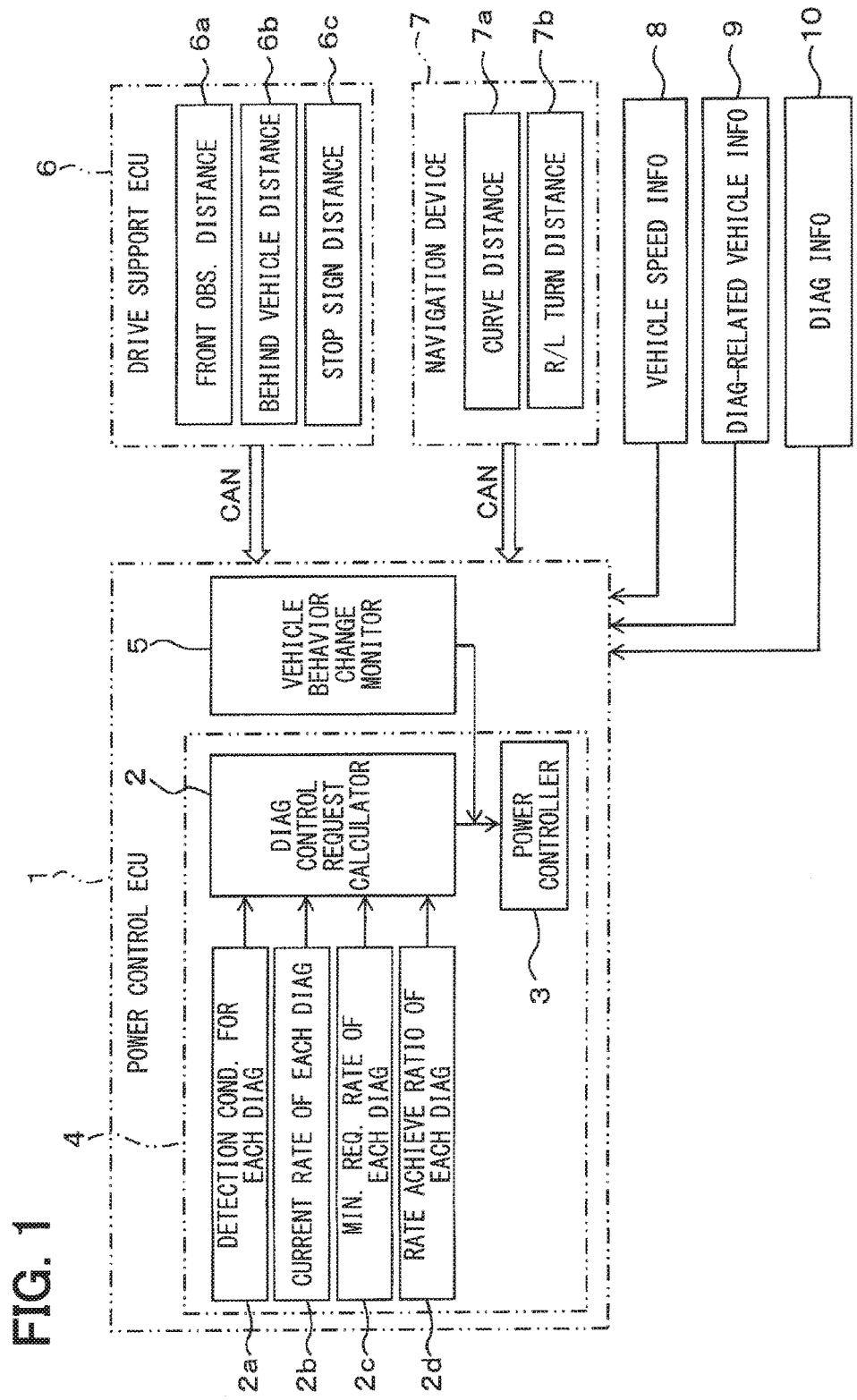
FIG. 1 is a block diagram of a configuration of one embodiment of the present disclosure.

FIG. 1 shows a block diagram, i.e., an outline, of the diagnosis system in an embodiment of the present disclosure, including a power control Electronic Control Unit (ECU) 1 that is disposed in a vehicle such as an engine vehicle or in a hybrid vehicle, equipped with a function for performing an automatic drive control (i.e., auto-drive).

Practically, the power control ECU 1 is constituted as a control circuit provided with a Central Processing Unit (CPU), a memory, an interface, etc., as illustrated with the block of functions in FIG. 1.

The power control ECU 1 (i.e., may simply be referred to as ECU 1 hereafter) is provided with function blocks, i.e., a diagnosis controller 4 that includes (i) a power controller 3 for controlling the power source such as an engine, an electrical drive device and a diagnosis control request calculator 2 for generating control information regarding a control of the power source by the controller 3. The diagnosis control request calculator 2 serves as a calculation processor, and receives a detection condition for each diagnosis 2a, current rate of each diagnosis 2b, minimum requirement rate of each diagnosis 2c, and a rate achieve ratio of each diagnosis 2d.

The ECU 1 is provided with a vehicle behavior change monitor 5 as its function block, and receives information from other in-vehicle ECUs via a Controller Area Network (CAN, a registered trademark), such as a drive support ECU 6, a car navigation device 7 and the like.

The ECU 1 also receives vehicle-speed information 8, vehicle information 9 related to the diagnosis (i.e., fault diagnosis) and the like from in-vehicle sensors, and receives diagnosis information 10 from a fault diagnosis device.

The drive support ECU 6 is provided with a function that measures the distance to the obstacle in front or behind the vehicle by receiving information from a radar, a camera or other in-vehicle devices.

With such function, the drive support ECU 6 generates distance information 6a representing a distance to a front obstacle, distance information 6b representing a distance to a behind vehicle, or distance information 6c representing a distance to a position of a stop sign together with other information, and provides the information 6a, 6b, 6c to the ECU 1.

The car navigation device 7 generates, for example, distance information 7a representing a distance to a curved road located in the travel direction of the vehicle, distance information 7b representing a distance to the next right or left turn position and the like, and provides the information 7b, 7b to the ECU 1.

Note that the ECU 1 is configured to be receiving various information from the drive support ECU 6 and/or the car navigation device 7 as a CAN signal at an interval of, for example, 65 msec.

In the present embodiment, the ECU 1 performs diagnosis detection, i.e., performing diagnosis of diagnosis items, which may also be performed by non-illustrated other ECUs, with the result of performed diagnosis received by the ECU 1 together with diagnosis rate of the performed diagnosis item. Further, as described above, the function blocks described above is actually provided by software, i.e., by executing a program, which is described in the following as operation control by the ECU 1.

FIG. 2 shows an example of the information about plural self-diagnosis items, including a current diagnosis rate, a minimum requirement rate set by regulation, and a rate achieve ratio.

Now, the current diagnosis rate is a value, i.e., a rate, of the number of diagnoses performed for a certain diagnosis item against the number of the trips. For example, for a diagnosis item of catalyst degrade, the current rate of "0.17" is a value representing that the diagnosis of catalyst degrade is performed 17 times in the 100 trips.

The minimum requirement rate of regulation is a rate defined by relevant regulation, which is considered as a minimum requirement for the subject diagnosis item. The rate achieve ratio is a ratio of the current diagnosis rate against the minimum requirement rate of the regulation. The rate achieve ratio is calculable according to the following equation:

Rate achieve ratio=the current diagnosis rate/the minimum requirement rate of the regulation For example, the rate achieve ratio of "0.5" for the diagnosis item of catalyst degrade represents that the current diagnosis rate is just the half of the minimum requirement rate of regulation. Therefore, when the current diagnosis rate rises to be equal to the minimum requirement rate of regulation, the rate achieve ratio will be "1."

FIG. 3 shows an example of the detection conditions and the control information about each of the plural diagnosis items.

As shown in FIG. 3, each diagnosis item has various kinds of state information required for satisfying the detection condition. Among the state information of each of the plural diagnosis items, the conditions on the left half of the diagram are about the controllable states under control of the ECU 1, and the conditions on the right half of the diagram are about the uncontrollable states by the ECU 1.

Further, as shown in FIG. 4, when the acceleration or deceleration is required, the control information set up by the ECU 1 is shown for each of the controllable states described above. That is, a change amount required for acceleration and a change amount required for deceleration respectively represent "by how much" each of the controllable states are changeable in the unit of relevant states. Further, a post-accel/decel prohibition time represents, as the control information, a time after the acceleration or deceleration during which the next acceleration or deceleration is prohibited.

Next, the effects of a rate improvement control at an auto-drive time based on the above-mentioned configuration are described with reference to FIGS. 5 to 14 as well as other drawings.

Figure 5:
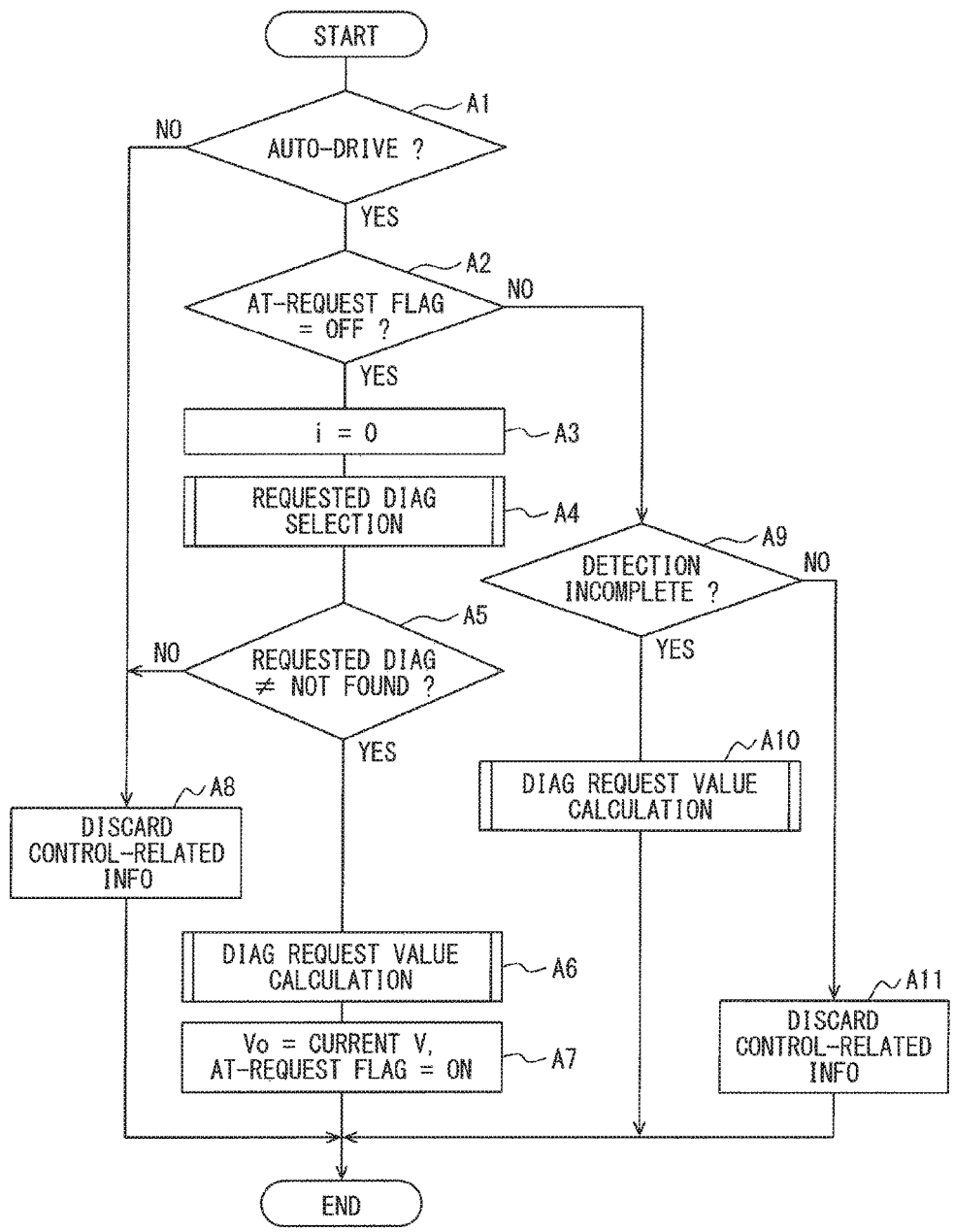
FIG. 5 is a flowchart of a diagnosis control request calculation process.

FIG. 5 shows a flowchart for describing the contents of a diagnosis control request calculation process performed by the ECU 1, which is called for, for example, at the cycle of 65 msec. for repeated execution.

In FIG. 5, the ECU 1 in Step A1 determines whether the current drive state is an auto-drive or not, and determines it as YES when the current drive state is the auto-drive, and the process proceeds to a subsequent Step A2.

In Step A2, the ECU 1 determines whether a diagnosis control at-request flag is OFF (i.e., whether the diagnosis control is currently requested for), and determines it as YES when the diagnosis control at-request flag is OFF, and the process proceeds to Step A3. Then, the ECU 1 sets an index i of a not-yet-detected (i.e., not-yet performed/diagnosed/enabled) diagnosis item to "0", which is described later in the description of Step A3, and the process proceeds to Step A4 for performing a requested diagnosis item selection process.

As the requested diagnosis item selection process in Step A4 of FIG. 5, the ECU 1 performs a flowcharted process of FIG. 6, i.e., the entire requested diagnosis item selection process, which is mentioned later. Then, while performing the requested diagnosis item selection process, the ECU 1 performs a detailed process, i.e., a detailed flowcharted process of FIG. 7 regarding the details of the requested diagnosis item selection process, which is also mentioned later. The index i set up in Step A3 is used to point to the not-yet-detected diagnosis item in the requested diagnosis item selection process.

Now, the process proceeds to a subsequent Step A5, assuming that the requested diagnosis item selection process of Step A4 is complete, and the ECU 1 determines whether the requested diagnosis item is not in a "NOT FOUND" state. That is, when the requested diagnosis item is "FOUND", Step A5 is determined as YES, and the process proceeds to the subsequent Step A6, and the ECU 1 performs a diagnosis request value calculation process.

The ECU 1 performs the diagnosis request value calculation process according to the flowchart of FIG. 8.

Next, the process proceeds to Step A7, and, after recording a current vehicle speed V as a diagnosis control start time vehicle speed Vo and setting the diagnosis control at-request flag to ON, the ECU 1 ends the program.

In a different path of the flowchart, the process proceeds to Step A8 when it is determined as NO in Step A1, namely, when the current drive state is not the auto-drive, or, when it is determined as NO in Step A5 (i.e., when the requested diagnosis item is "NOT FOUND"), the ECU 1 clears, i.e., discards, control-related information. The clearance of the control-related information may be, for example, clearing/erasing (i) the diagnosis control at-request flag 10o that is set by the program to be mentioned later, (ii) a diagnosis control requesting flag and a control target value to various controls, and/or (iii) the diagnosis control start time vehicle speed Vo, which may be respectively set by a below-mentioned program.

In NO branch from Step A2 (i.e., when the at-request flag is ON), the process proceeds to Step A9, and the ECU 1 checks whether detection of the requested diagnosis item is incomplete or not, and, when detection is incomplete, i.e., YES, the process proceeds to a subsequent Step A10.

In Step A10, the ECU 1 performs the diagnosis request value calculation process, and updates the diagnosis request value. The diagnosis request value calculation process in Step A10 is the same as that of Step A6 mentioned above, and the ECU 1 performs the process according to the flowchart shown in FIG. 8.

When Step A9 is determined as NO, i.e., detection in Step A9 is complete, the process proceeds to Step A11, and the ECU 1 clears the control-related information. The process for clearing the control-related information is the same as the process in Step A8 mentioned above.

Next, the contents of the requested diagnosis item selection process called for in the above-mentioned Step A4 are described with reference to FIG. 6.

In Step B1, the ECU 1 calculates the rate achieve ratio of the detection incomplete diagnosis item, i.e., of a diagnosis item whose diagnosis is incomplete in the current trip. As described above, the rate achieve ratio is calculated by dividing the current diagnosis rate by the minimum requirement rate of the regulation. When the rate achieve ratio is equal to or greater than "1", it means that the minimum requirement rate required by regulation is satisfied for a certain diagnosis item.

Then, in Step B2, the ECU 1 re-arranges the detection incomplete diagnosis items according to the rate achieve ratios, i.e., in an ascending order of the rate achieve ratios. In such case, the ECU 1 assigns the index number of [0] to [N] to each of the re-arranged diagnosis items. That is, the detection incomplete diagnosis item N is the last one in such ascending order of the diagnosis items.

In Step B3, the ECU 1 determines whether the rate achieve ratio of detection incomplete diagnosis item [0] is less than "1", and, when it is determined as less than "1", i.e., YES, the process proceeds to Step B4, and the detailed process of the requested diagnosis item selection is performed, which is mentioned later.

As a result, when at least one diagnosis item is determined as YES in Step B3, it means that at least one diagnosis item has to be detected/diagnosed as a requested diagnosis item, which is then processed in details in Step B4.

Further, when the determination in Step B3 is NO, i.e., when the rate achieve ratio of the detection incomplete diagnosis item [0] is equal to or greater than "1", the ECU 1 sets in Step B5 that the requested diagnosis item is "NOT FOUND", i.e., there is no diagnosis item for which the diagnosis should be performed, and returns the process to Step A5 after ending the program.

In other words, since the rate achieve ratio of the detection incomplete diagnosis item [0] is at least equal to "1", which is the lowest ratio among the indexed diagnosis items, the rest of the diagnosis items should have at least equal-to-"1" ratio, thereby making it unnecessary for the rest of the indexed diagnosis items to have a determination in terms of whether to detect, i.e., to perform, a diagnosis or not.

Figure 7:
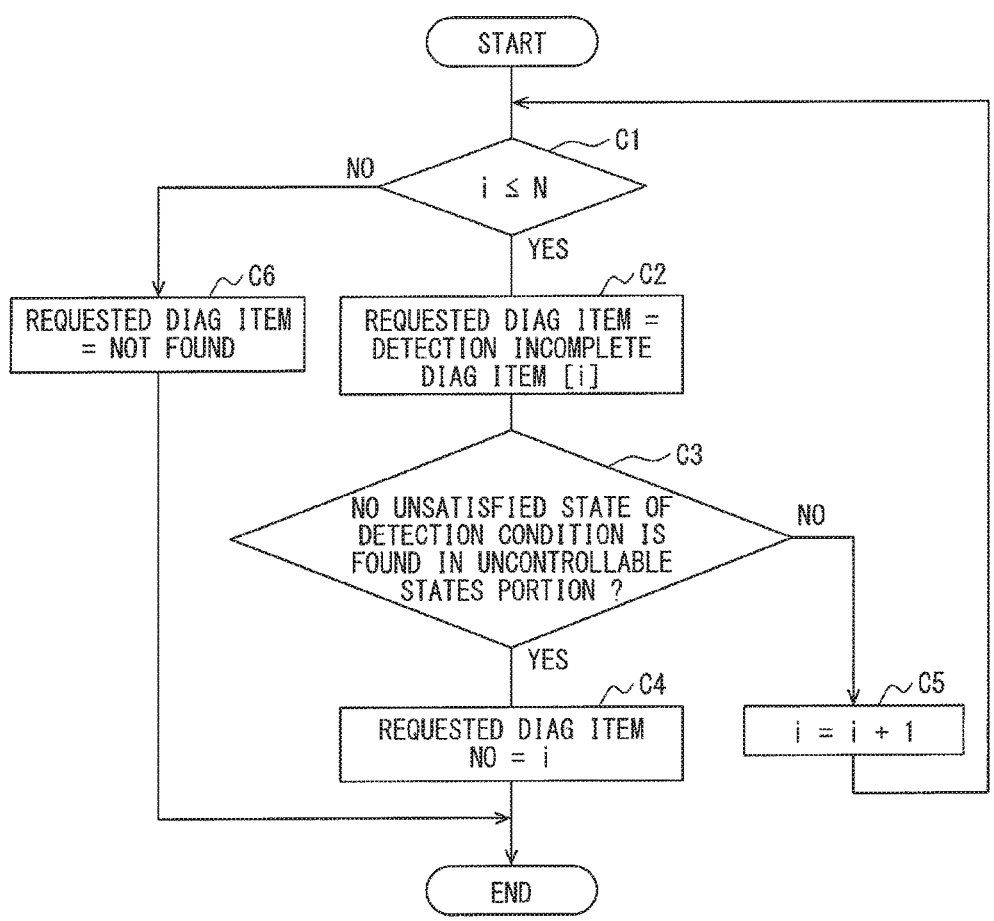
FIG. 7 is a flowchart of details of the requested diagnosis item selection process.

Next, the detailed process of the requested diagnosis item selection in above-mentioned Step B4 is described with reference to FIG. 7.

In Step C1, the ECU 1 determines whether the value of i, which is an index of the detection incomplete diagnosis item in the current trip is equal to or less than N, i.e., the total number of detection incomplete diagnosis items. When the index i of the detection incomplete diagnosis item is equal to or less than N, Step C1 is determined as YES, and the process proceeds to Step C2. That means, there are still some diagnosis items for which the detection (i.e., diagnosis) has not yet been performed.

Then, in Step C2, the ECU 1 sets a detection incomplete diagnosis item [i] as a requested diagnosis item, which is pointed to by an index i of the detection incomplete diagnosis item. Note that, as mentioned above, when the index i is "0", it means that such a diagnosis item has the lowest rate achieve ratio among the detection incomplete diagnosis items.

Next, the process proceeds to Step C3, and the ECU 1 determines whether there is no "UNCONTROLLABLE STATE" included in a detection condition unsatisfied portion of the requested diagnosis item. That is, it is determined whether, from among the detection conditions of each of the diagnosis items, no unsatisfied state of the detection condition is found in the right half of the diagram of FIG. 3, i.e., in the portion of the diagram listing the "UNCONTROLLABLE STATES".

When there is no "UNCONTROLLABLE STATE" found in Step C3, i.e., Step C3 is determined as YES, the ECU 1 advances the process to a subsequent Step C4, and memorizes the index i of the requested diagnosis item as the requested diagnosis item No=i, and ends the program.

Note that the data memorized in the above-described manner is, as mentioned below, utilized for specifying the next lowest rate achiever diagnosis item when this requested diagnosis item's detection condition satisfaction control is aborted in a vehicle behavior change monitoring process shown in FIG. 10, as described later.

Further, when the ECU 1 finds the uncontrollable state in Step C3, i.e., when Step C3 is determined as NO, the ECU 1 advances the process to Step C5, and, after incrementing the index i by "1" for the detection incomplete diagnosis item, returns the process back to Step C1, for repeating the above-mentioned process.

When the ECU 1 determines Step C1 as NO, i.e., when the value of index i exceeds the number N of the detection incomplete diagnosis items, it means that there is no diagnosis items left for which the diagnosis may be requested, thus the ECU 1 in Step C6 sets that the requested diagnosis item is "NOT FOUND", and ends the program.

Next, the contents of the diagnosis request value calculation process performed in Step A6 or Step A10 of the diagnosis control request calculation process of FIG. 5 mentioned above are described with reference to FIG. 8.

This process, i.e., the diagnosis request value calculation process, is performed when (i) the requested diagnosis item is selected in Step A4 of FIG. 5, i.e., in the diagnosis control request calculation process and (ii) the determination in the subsequent Step A5 of whether the requested diagnosis item is not in a "NOT FOUND" state is determined as YES. Or, this process is performed when the detection incomplete determination in Step A9 of FIG. 5, i.e., in the diagnosis, control request calculation process.

In Step D1, the ECU 1 obtains a detection condition range for each of the "controllable states" of the requested diagnosis items. Then, in Step D2, the first "controllable state" is specified by inputting a value of "0" to an index j, based on an order of the "controllable states" defined by index values of "0" to "N2". In such manner, the detection condition ranges of the "controllable states" are obtained from a table of FIG. 3, and the first "controllable state" is specified among other "controllable states".

Next, in Step D3, the ECU 1 determines whether the current "state" specified/pointed by the index j is outside of the detection condition range or not. That is, for example, an actually-observed value of the subject "state" item, e.g., "THROTTLE OPEN DEGREE" as the first "state", is within the detection condition range of 30° to 40° for the diagnosis item of "CATALYST DEGRADE".

When Step D3 is determined as YES, i.e., when the current "state" specified by the index j is outside of the detection condition range, the ECU 1 advances the process to Step D4, and the ECU 1 sets a control target value for the current "state" as a value that is within the detection condition range and is closest to the actually-observed value from a sensor, for example.

Then, the ECU 1 in Step D5 sets a diagnosis control requesting flag of the current "state" to ON. Further, when Step D3 is determined as NO, i.e., when the current "state" is within the detection condition range, the ECU 1 advances the process to Step D6, and clears the control target value of the current "state" and the diagnosis control requesting flag of the current "state".

After performing Step D5 or D6, the ECU 1 in Step D7 increments the index j by "1" for changing the current "state" to the next one of "the controllable states". Then, in Step D8, the ECU 1 determines whether the index j indicating an order of "the controllable states" exceeds the value N2, i.e., the total number of "the controllable states."

When the index j is not exceeding the value N2 of "the controllable states" in Step D8, i.e., when Step D8 is NO, the ECU 1 returns the process to Step D3, and repeats the same processes for the next "controllable state". When the index j is exceeding the value N2 of "the controllable states" in Step D8, i.e., when Step D8 is YES, the ECU 1 ends the program, since YES in Step D8 means that the entire "controllable states" are already processed.

Next, a request mediation process in the present embodiment performed for each cycle of the control of the "controllable states" is described with reference to FIG. 9. The control of "the controllable state" in the context of the present embodiment means a target throttle open degree calculation control or the like. Note that the request mediation process is called for at every 65 msec for each cycle of the control of the "controllable states".

The ECU 1 in Step E1 determines whether the diagnosis control requesting flag is currently set to ON. When the flag is ON in Step E1, i.e., when Step E1 is determined as YES, the ECU 1 advances the process to Step E2, and sets the control target value calculated by the diagnosis request value calculation process mentioned above as an actual control target value, and ends the program. In such case, the ECU 1 gives priority to a control target of a diagnosis request over a control target of the auto-drive control.

Further, when the diagnosis control requesting flag is currently set to OFF, i.e., when Step E1 is determined as NO, the ECU 1 advances the process to Step E3, and sets a target value for the auto-drive control such as a lead vehicle follow control, or a constant speed travel, instead of setting the control target value of the diagnosis, and ends the program.

Next, a vehicle behavior change monitoring process performed in the present embodiment is described with reference to FIG. 10. The vehicle behavior change monitoring process is called for at a timing of every 65 msec.

In Step F1, the ECU 1 determines whether the diagnosis control at-request flag is ON, and, when the diagnosis control at-request flag is ON, i.e., when Step F1 is YES, the process proceeds to a subsequent Step F2.

Then, in Step F2, the ECU 1 determines whether a previous vehicle speed (i.e., a previous V) is different from a previous vehicle speed initial value (i.e., a previous Vs), and, when V is different from Vs, i.e., when Step F2 is YES, the ECU 1 uses the previous V, and, then in Step F3, calculates a vehicle speed change amount ΔV as a difference between the previous vehicle speed V and a current vehicle speed V, i.e., according to the following equation:

Vehicle-speed change amount ΔV=previous V−current V

Further, when Step F2 is NO, i.e., when the previous V is equal to the previous Vs, the process proceeds to Step F4, and sets the previous V to a diagnosis control start time vehicle speed Vo, and proceeds to Step F3.

After performing Step F3, the ECU 1 in Step F5 sets the current V, i.e., the current vehicle speed, as a value of the previous V, i.e., as the previous vehicle speed, and proceeds to Step F6.

The ECU 1 in Step F6 determines whether an absolute value of the vehicle speed change amount ΔV is equal to or greater than a threshold Vth, which is a determination threshold of whether the vehicle speed change is large. In such case, the threshold Vth is set to a value of 5 km/h, for example, for the detection of the speed change.

The ECU 1 determines Step F6 as YES when the vehicle speed change amount ΔV is equal to or greater than the determination threshold Vth of vehicle speed change amount, and the process proceeds to Step F7.

Note that, in Step F6, when it is determined as NO, i.e., when the vehicle speed change amount ΔV is smaller than the determination threshold Vth, the ECU 1 continues the diagnosis control request as is.

In Step F7, according to the flowchart shown in FIG. 11, the ECU 1 performs a vehicle behavior change subdue necessity determination process, as described below. After proceeding to Step F8, the ECU 1 determines whether a vehicle behavior change subdue required flag, which is obtained as a result of the vehicle behavior change subdue necessity determination process performed in Step F7, is ON.

When the subdue required flag in ON, i.e., when Step F8 is YES, the ECU 1 performs a vehicle behavior change subdue propriety determination process in a subsequent Step F9.

Figure 13:
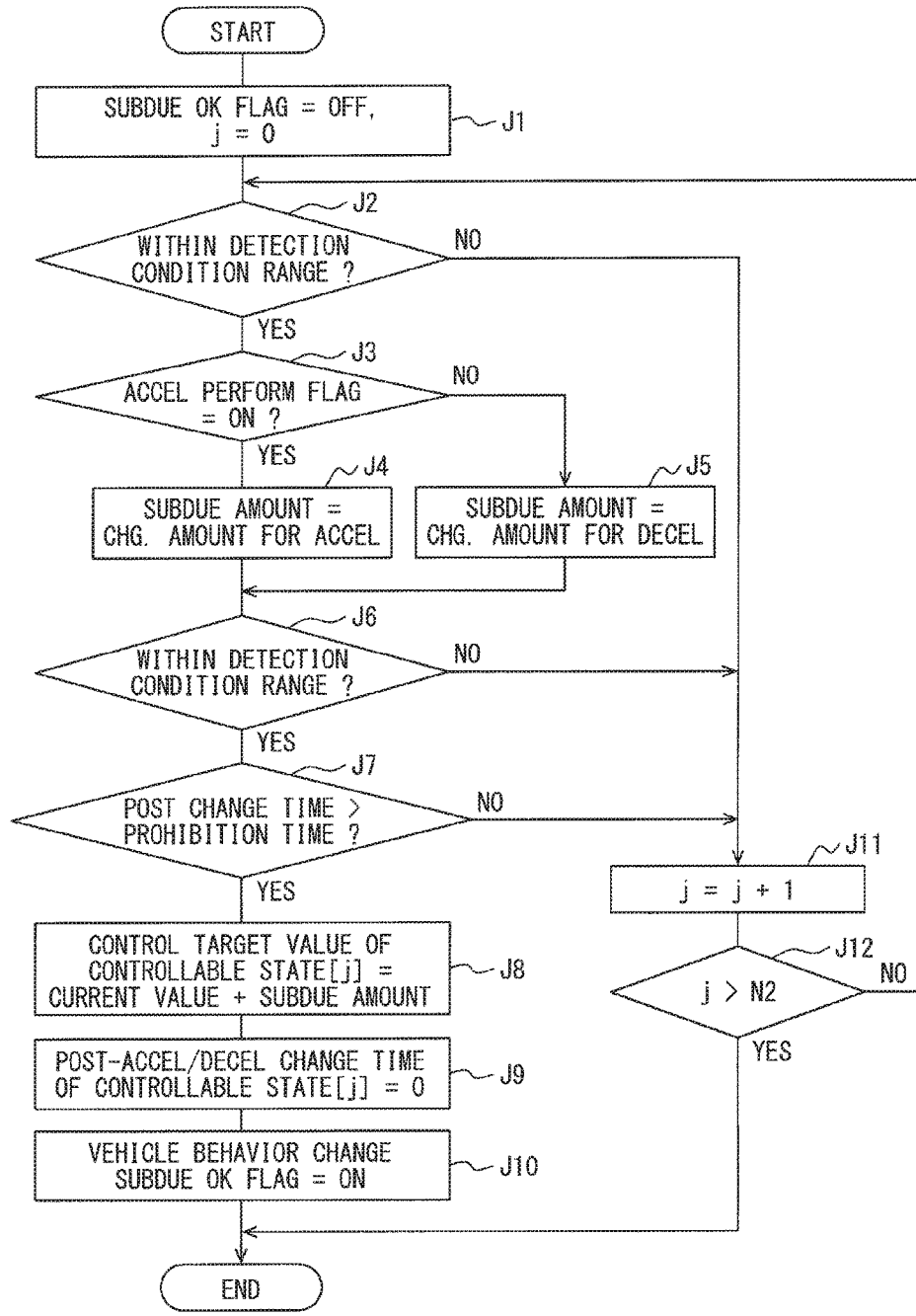
FIG. 13 is a flowchart of a vehicle behavior change subdue propriety determination process.

In Step F9, according to the flowchart shown in FIG. 13, the ECU 1 performs, as mentioned later, the vehicle behavior change subdue propriety determination process. Note that, when the subdue required flag is OFF, i.e., when Step F8 is NO, the ECU 1 continues the diagnosis control request as is (i.e., without change), and performs a process mentioned later after proceeding to Step F14.

After proceeding to Step F10, the ECU 1 determines whether a vehicle behavior change subdue OK flag, which is obtained by the vehicle behavior change subdue propriety determination process performed in Step F9, is ON.

When the vehicle behavior change subdue OK flag is ON in Step F10, i.e., when Step F10 is YES, the ECU 1 performs a process that sets up the control target value, while satisfying the diagnosis detection condition, so that the vehicle behavior change is subdued, i.e., is controlled, and proceeds to Step F14.

Further, when the Step F10 is NO, i.e., when the vehicle behavior change subdue OK flag is OFF, the ECU 1 determines that it is impossible to subdue the vehicle behavior change, while satisfying the diagnosis detection condition of the currently requested diagnosis item.

In such case, the process proceeds to Step F11, and the ECU 1 selects the next lowest rate achiever diagnosis item as the requested diagnosis item, by incrementing the index i, i.e., the currently requested detection incomplete diagnosis item number, by "1".

Figure 6:
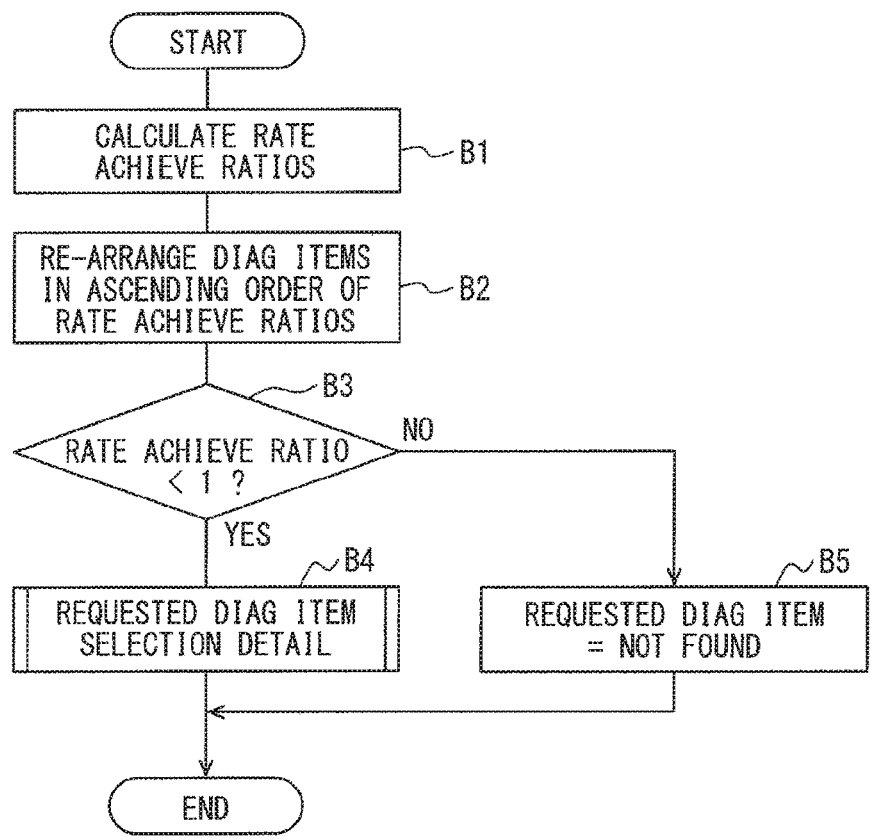
FIG. 6 is a flowchart of a requested diagnosis item selection process.

Then, the ECU 1 in Step F12 performs the requested diagnosis item selection process of the above-mentioned FIG. 6.

Next, the ECU 1 in Step F13 initializes the previous V to the previous Vs so that the diagnosis control start time vehicle speed can be set to the previous V when the next requested diagnosis item is selected and the diagnosis request control is started.

The ECU 1 in Step F14, i.e., in the last step of the program, calculates, by adding 65 msec to a post-acceleration/deceleration change time [0 to N2], a period of time from the clearance of the post-acceleration/deceleration change time described later in detail with reference to FIG. 13.

Next, the contents of the vehicle behavior change subdue necessity determination process in Step F7 of the vehicle behavior change monitoring process of FIG. 10 mentioned above are described with reference to FIG. 11.

This process is performed for "emergency avoidance", for example, for avoiding a situation in which, due to a change of the detection condition that causes a travel state of the vehicle, a distance-based reach time to reach a front/behind vehicle, the stop sign or the like is decreased to be shorter than expected based on the determination/calculation of the distance-based reach time.

Figure 14:
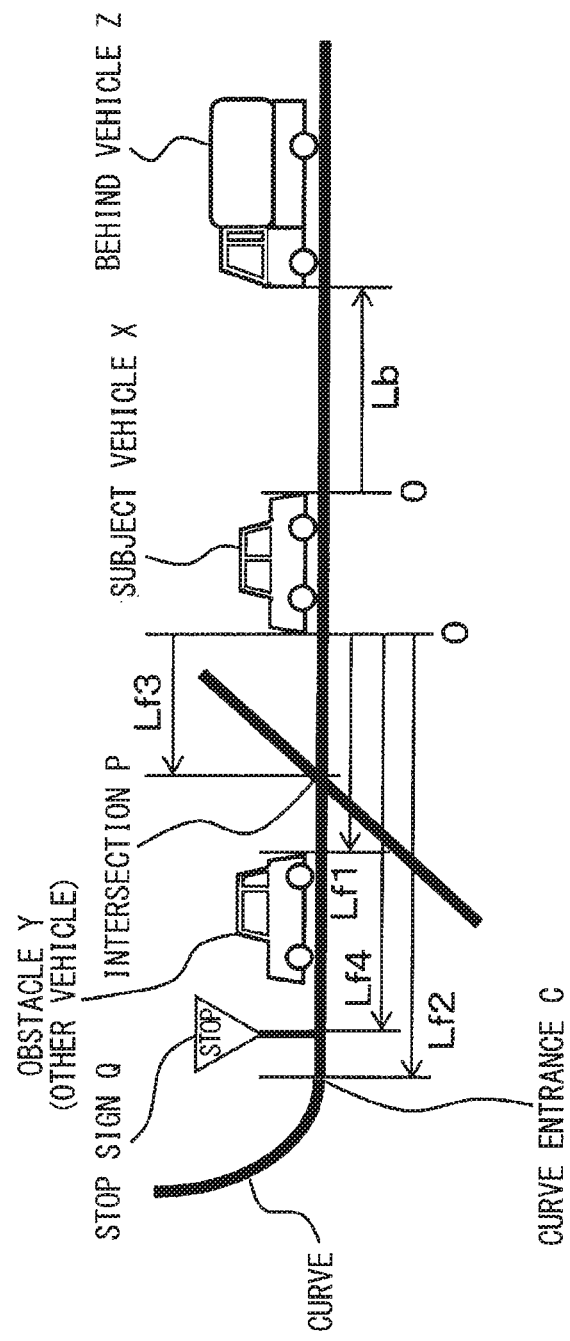
FIG. 14 is an illustration of relationship between a front distance and a behind distance.

In such case, for the calculation of the above-mentioned relationship, a FIG. 14 illustrated situation, i.e., positions of the objects, is assumed. That is, a subject vehicle X travels a route to a destination on a road, with a front obstacle/vehicle Y nearest to the subject vehicle X at a distance Lf1. Further, a curve entrance C in front of and nearest to the subject vehicle X is at a distance Lf2, and an intersection P in front of and nearest to the subject vehicle X is at a distance Lf3. Further, a stop sign Q in front of and nearest to the subject vehicle X is at a distance Lf4. Further, a behind vehicle Z traveling behind the subject vehicle X and nearest to the subject vehicle X is at a distance Lb.

Further, based on the above-described distances, four front reach times Tf1, Tf2, Tf3, Tf4, and a behind reach time Tb are calculated.

Now, the front reach time Tf1 is a time for the subject vehicle X to reach the obstacle Y, the front reach time Tf2 is a time for the subject vehicle X to reach the curve entrance C, the front reach time Tf3 is a time for the subject vehicle X to reach the intersection P, and the front reach time Tf4 is a time for the subject vehicle X to reach the stop sign Q. Also, the behind reach time Tb is a time for the behind vehicle Z to reach (i.e., to catch up) the subject vehicle X.

Figure 10:
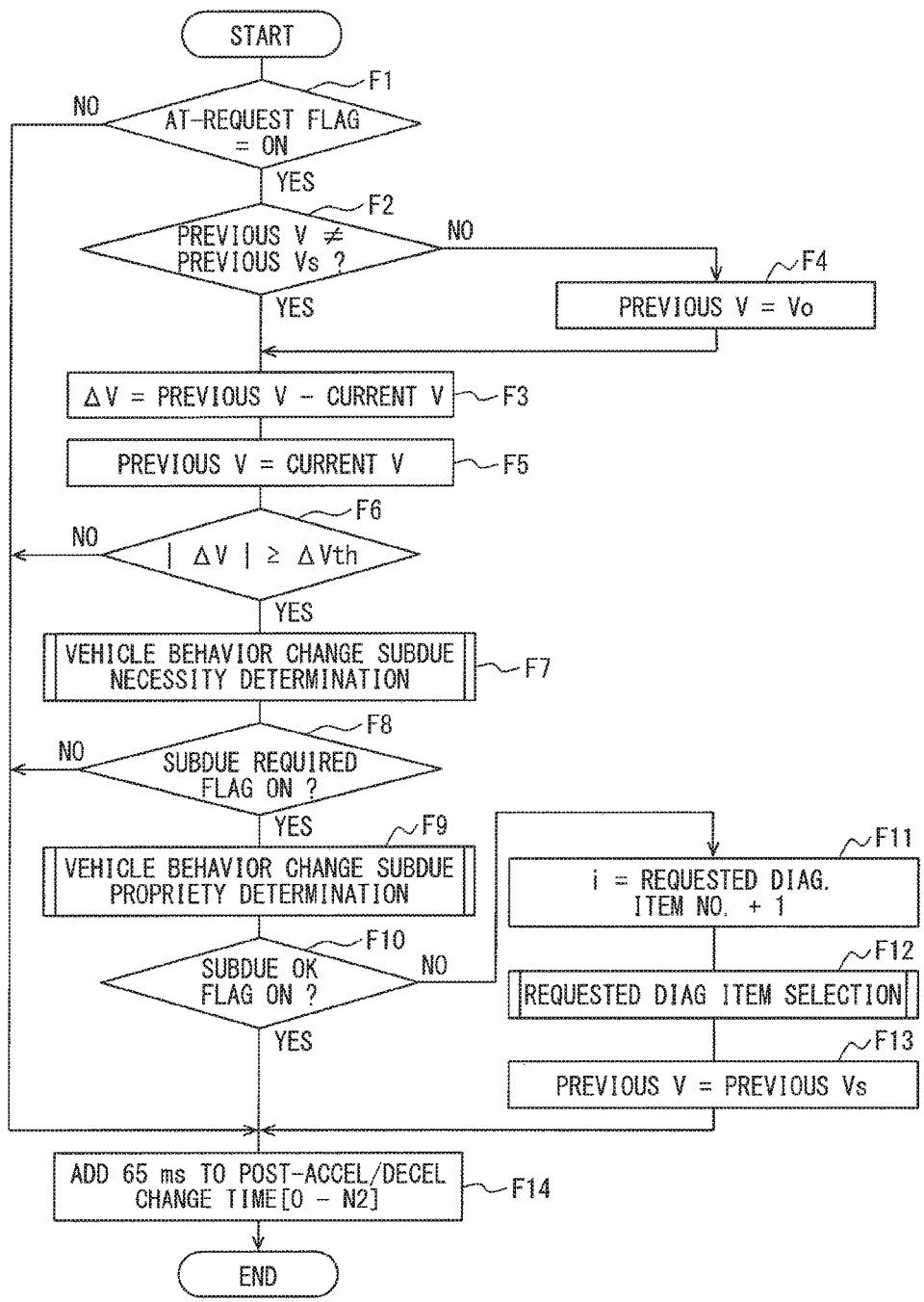
FIG. 10 is a flowchart of a vehicle behavior change monitoring process.

When the vehicle behavior change subdue necessity determination process in Step F7 of the vehicle behavior change monitoring process of FIG. 10 is called for, the ECU 1 in Step G1 calculates a front reach time Tf mentioned later. The ECU 1 performs a process for calculating a front reach time (Tf) according to the flowchart shown in FIG. 12, and calculates the front reach time Tf. The process for calculating the front reach time (i.e., a front reach time calculation process) is mentioned later.

Next, the ECU 1 in Step G2 obtains a distance Lb from the drive support ECU 6 to the behind vehicle Z, and calculates the behind reach time Tb in a subsequent Step G3.

The ECU 1 firstly calculates a temporary value Ttb, in a calculation process of the behind distance Tb, as shown in an equation in the following, i.e., by dividing the currently-obtained behind distance Lb by a per-unit-time travel distance. The per-unit-time travel distance is, for the ease of calculation, derived by subtracting the currently-obtained behind distance Lb from the previously-obtained behind distance Lb, as shown below:

$$Ttb = \text{current } Lb/(\text{previous } Lb - \text{current } Lb)$$

When the value of Ttb calculated by the above method takes a positive value, the situation is that, due to a faster speed of the behind vehicle Z than the subject vehicle X, a distance therebetween decreases as time lapses. In such case, the ECU 1 sets up Ttb as a value of the behind reach time Tb.

$$Tb = Ttb$$

When the value of Ttb calculated by the above method takes a negative value, the situation is that, due to a slower speed of the behind vehicle Z than the subject vehicle X, a distance therebetween increases as time lapses. In such case, the ECU 1 adds an absolute value of Ttb (i.e., as an increase of the inter-vehicle distance in a current cycle of process) to the previous value of the reach time Tb, for calculating the current reach time Tb, as shown in the equation below:

$$Tb = \text{previous } Tb + |Ttb|$$

Figure 11:
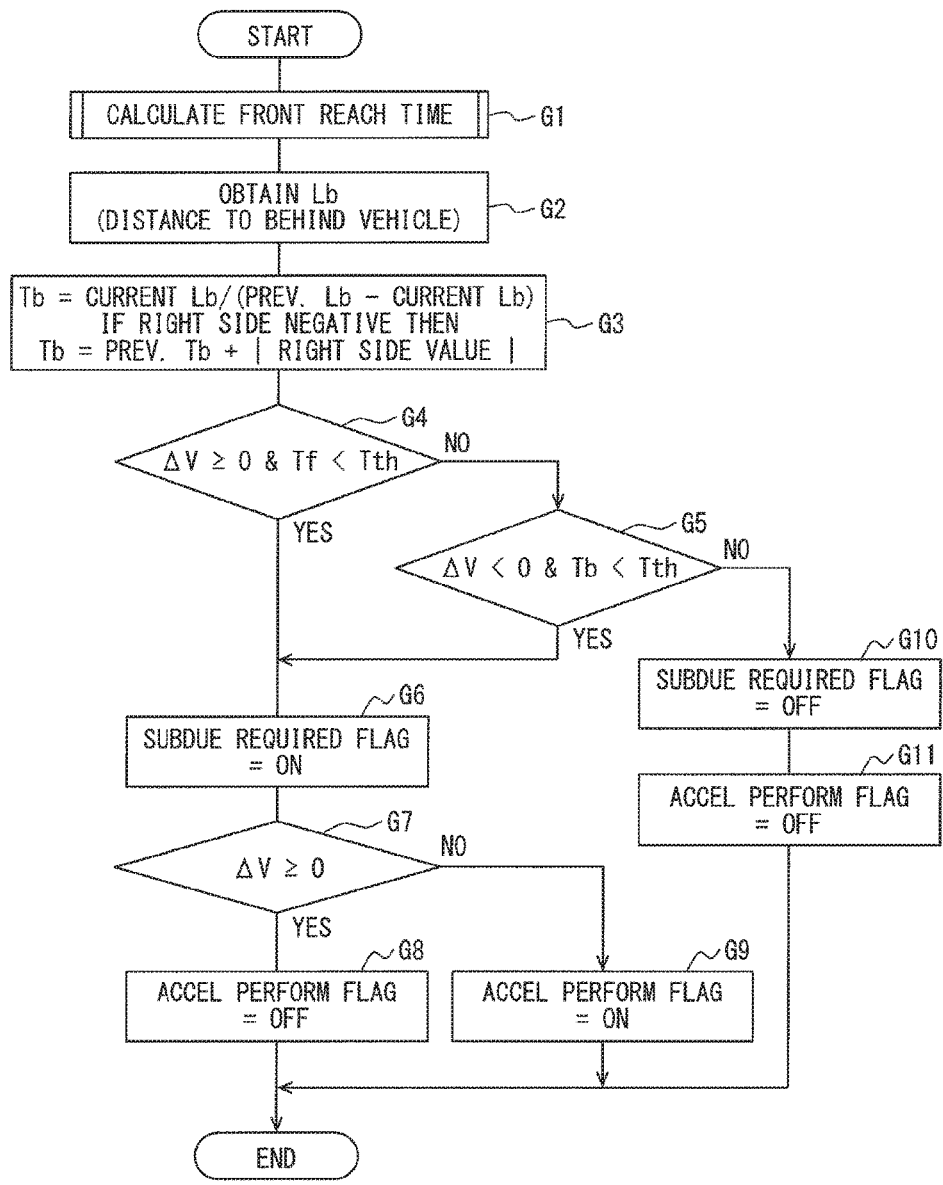
FIG. 11 is a flowchart of a vehicle behavior change subdue necessity determination process.

Although, in Step G3 of FIG. 11, the above-mentioned calculation process for calculating the behind reach time Tb is simplified as "IF RIGHT SIDE NEGATIVE THEN", such a condition is the same as the above method.

Next, when, in Step G4, (i) the vehicle speed change amount ΔV is equal to or greater than 0 and (ii) the front reach time Tf is smaller than the threshold Tth of a reach time margin determination, the ECU 1 determines such a situation as YES in Step G4, and proceeds to Step G6.

Further, after determining Step G4 as NO, when it is determined in a subsequent Step G5 that (i) the vehicle speed change amount ΔV is negative and (ii) the behind reach time Tb is smaller than the threshold Tth of the reach time margin determination, i.e., when Step G5 is YES, the ECU 1 proceeds to Step G6.

In case that Step G4 or G5 is determined as YES, it means that the vehicle behavior change subdue control is required. Therefore, in a subsequent Step G6, the ECU 1 turns the vehicle behavior change subdue required flag to ON.

The ECU 1 in a subsequent Step G7 determines whether the vehicle speed change amount Δ ΔV is greater than "0". In case that Step G7 is determined as YES, i.e., that the vehicle speed change amount ΔV is equal to or greater than "0", it means that a deceleration is required. Therefore, in a subsequent Step G8, the ECU 1 turns an acceleration perform flag to OFF.

Further, in case that Step G7 is determined as NO, i.e., that the vehicle speed change amount ΔV is smaller than "0", it means that an acceleration is required. Therefore, in Step G9, the ECU 1 sets an acceleration perform flag to ON.

Further, in case of the above-mentioned Step G5 determined as NO, it means that both of the front reach time Tf and the behind reach time Tb are equal to or greater than the threshold Tth of the reach time margin determination, i.e., the time to reach the front obstacle/behind vehicle has some margin.

In such case, because there is no need to perform a control process for subduing the vehicle behavior, the ECU 1 turns the vehicle behavior change subdue required flag to OFF in Step G10, and turns the acceleration perform flag to OFF in a subsequent Step G11.

The ECU 1 ends the program, after performing one of the above-mentioned Steps G8, G9, or G11.

Next, regarding the vehicle behavior change subdue necessity determination process of the above-mentioned FIG. 11, the contents of the process of the front reach time calculation performed in Step G1 are described with reference to the flowchart of FIG. 12.

The ECU 1 in Step H1 obtains, from the drive support ECU 6, the distance Lf1 to the front obstacle Y, i.e., a distance to the other vehicle or to the obstacle in front of the subject vehicle X, that is, along a travel route of the vehicle X.

Next, the ECU 1 in Step H2 obtains, from the car navigation device 7, the distance Lf2 to the curve entrance C in front of the subject vehicle X, along the travel route.

Then, the ECU 1 in Step H3 obtains the distance Lf3, from the car navigation device 7, the distance Lf3 to the right/left turn position at the intersection P along the travel route of the subject vehicle X.

Then, the ECU 1 in Step H4 obtains, from the drive support ECU 6, the distance Lf4 to the stop sign Q in front of and on the travel route of the subject vehicle X.

The ECU 1 memorizes the distances Lf1-Lf4 obtained in the above-mentioned Steps H1-H4 as current Lf1-Lf4, and memorizes the data of the distances Lf1-Lf4 obtained in the previous cycle as previous Lf1-Lf4.

Next, the ECU 1 in Steps H5-H8 calculates each of the reach times Tf1-Tf4 about the distances Lf1-Lf4 obtained as mentioned above.

In such case, the ECU 1 firstly calculates a temporary value Ttf1 according to the following equation, i.e., by dividing the currently-obtained distance Lf1 by a difference between the previous Lf1 and the current Lf1, i.e., a travel distance during a preset period of time, as shown below:

$$Ttf1 = \text{current } Lf1/(\text{previous } Lf1 - \text{current } Lf1)$$

When Ttf1 calculated by the above method takes a positive value, the distance between the front obstacle Y and the subject vehicle X decreases as time lapses. In such case, the ECU 1 sets up Ttf1 as a value of the front reach time Tf1.

$$Tf1 = Ttf1$$

When Ttf1 calculated by the above method takes a negative value, the front obstacle Y may be a vehicle, and, in case that the speed of the vehicle is faster than the subject vehicle X, the distance between X and Y increases as time lapses.

In such case, the ECU 1 calculates the current front reach time Tf1 by adding an absolute value of Ttf1 (i.e., as an increase of the inter-vehicle distance in a current cycle of process) to the previous reach time Tf1 as shown in the following equation:

$$Tf1 = \text{the previous } Tf1 + |Ttf1|$$

Figure 12:
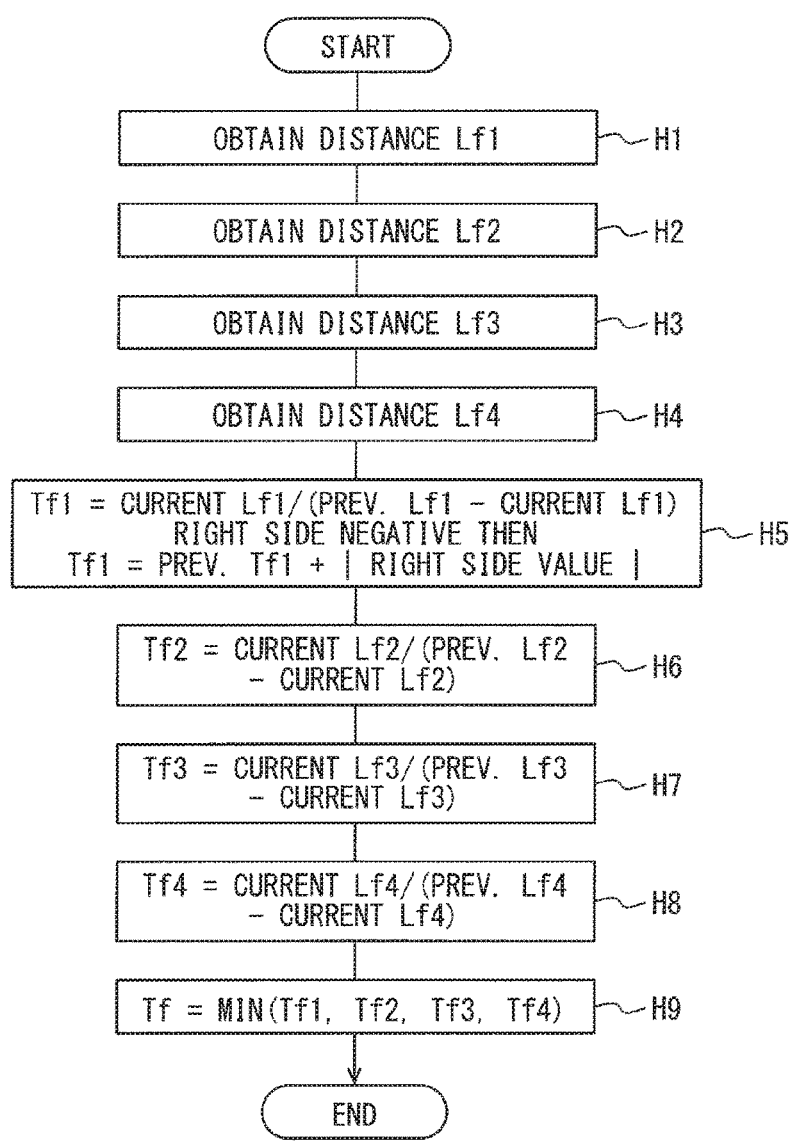
FIG. 12 is a flowchart of a front reach time calculation process.

Although, in Step H5 of FIG. 12, the above-mentioned calculation process for calculating the front reach time Tf1 is simplified as "IF RIGHT SIDE NEGATIVE THEN", such a condition is the same as the above method.

About the other front reach times Tf2-Tf4, the ECU 1 calculates Tf2-Tf4 in the same manner as the above-mentioned the front reach time Tf1 according to the following equations:

$$Tf2 = \text{current } Lf2/(\text{previous } Lf2 - \text{current } Lf2)$$

$$Tf3 = \text{current } Lf3/(\text{previous } Lf3 - \text{current } Lf3)$$

$$Tf4 = \text{current } Lf4/(\text{previous } Lf4 - \text{current } Lf4)$$

After calculating the front reach times Tf1-Tf4 as mentioned above 1 in Step H9, the ECU 1 selects the shortest one from among Tf1-Tf4 by using the MIN function, and sets the selected time as the front reach time Tf, and then ends the program.

Next, the contents of the process of the vehicle behavior change control propriety determination in Step F9 of the vehicle behavior change monitoring process of FIG. 10 mentioned above are described with reference to FIG. 13.

This process is a determination of whether to perform a subdue control when Step F8 of FIG. 10 is YES, i.e., when the vehicle behavior change subdue OK flag is ON.

The ECU 1 in Step J1 turns the vehicle behavior change subdue OK flag to OFF, and inputs "0" to the index j representing the order of "the controllable states."

The vehicle behavior change subdue OK flag is set to OFF, for the purpose of keeping the OFF state of the flag, when there is finally no vehicle behavior change subdue required situation by the end of the flowchart. Further, by setting the index j to "0", the start of the table of the "controllable states" in FIG. 3 is specified.

Next, the ECU 1 in Step J2 determines whether the actually-observed value of the current "state" specified by the index j, i.e., of one of the "controllable states", is within the detection condition range.

This is a determination of whether the current value of the subject diagnosis item is within the detection condition range, which may be, for example, a determination of whether the current value of an engine rotation number is within a detection condition range of 1500 to 3000 rpm for the diagnosis item of catalyst degrade.

When Step J2 is YES, the process proceeds to Step J3, and the ECU 1 determines whether the acceleration perform flag is ON.

The determination of whether the acceleration perform flag is ON means a determination of whether the vehicle behavior change subdue necessity determination process of FIG. 11 has set the acceleration perform flag to ON in Step G9. When Step J3 is YES, the process proceeds to Step J4, and the ECU 1 sets the change amount required for acceleration as a subdue amount, and then proceeds to Step J6. When Step J3 is NO, the process proceeds to Step J5, and the ECU 1 sets the change amount required for deceleration as a subdue amount, and then proceeds to Step J6. Note that a value of the change amount required for acceleration/deceleration is set to the values of FIG. 4, which correspond respectively to each of the "controllable states".

Next, the ECU 1 in Step J6 determines whether a sum of (i) the actually-observed value of the current "state" specified by the index j and (ii) the subdue amount set in Step J4 or Step J5 is still within the detection condition range. Then, the ECU 1 in Step J7 determines whether the post-acceleration/deceleration change time is greater than the post-acceleration/deceleration prohibition time. Note that the post-acceleration/deceleration prohibition time for each of the controllable states is set to the values in FIG. 4.

When Step J6 is YES and subsequent Step J7 is also YES, it means that the ECU 1 has determined that (i) the subject diagnosis item has the detection condition even after the addition of the subdue amount and (ii) the post-acceleration/deceleration change time is greater than the post-acceleration/deceleration prohibition time. In such case, the process proceeds to Step J8, and the ECU 1 sets the control target value of the "state" specified by the index j to a value that is a sum of the current value and the subdue amount.

Then, in Step J9, the ECU 1 sets the post-acceleration/deceleration change time to "0", and, in Step J10, turns the vehicle behavior change subdue OK flag to ON, and ends the program.

On the other hand, when Step J2 or Step J6 is determined as NO, that is, when it is determined that the detection condition range is exceeded, or when Step J7 is determined as NO, that is, when the post-acceleration/deceleration change time is equal to or less than the post-acceleration/deceleration prohibition time, the process proceeds to Step J11.

The ECU 1 in Step J11 increments, by "1", the index j specifying an order of "the controllable states", and then, in a subsequent Step J12, determines whether the index j specifying an order of "the controllable states" exceeds the total number N2 of "the controllable states."

The ECU 1 ends the program, when Step J12 is YES, i.e., when the value of the index j exceeds the total number N2 of "the controllable states". Further, when Step J12 is NO, i.e., when the value of the index j is not exceeding the total number N2 of "the controllable states", the ECU 1 returns the process to Step J2, and repeatedly performs the same Steps for the next one of the "controllable states."

As described above, during a time when an auto-drive is performed by the ECU 1, the detection incomplete diagnosis items are automatically controlled for the improvement of the rate achievement ratio. In such case, if the regulated minimum requirement rate has been changed, the setting for such regulated minimum requirement rate is changed, i.e., reflected, for automatically improving the rate achieve ratio according to the changed minimum requirement rate by regulations.

According to the present embodiment, the following effects are achievable.

The ECU 1 prioritizes the detection condition setting for the low rate achievers, i.e., for the diagnosis items having a low rate achieve ratios, thereby enabling an increase of the diagnosis rate of the fault diagnosis item for which more detection (i.e., diagnosis) opportunities should be provided.

Further, after the reaching of the rate achieve ratio to a preset value, the ECU 1 may be configured not to set the detection condition, thereby preventing the diagnosis rate improvement control from affecting the control of the auto-drive.

Further, when the detection condition of the fault diagnosis item in the uncontrollable states, such as a suction air temperature or the like, is not satisfied, the ECU 1 may be configured (i) to abort/cancel the detection condition setting of a fault diagnosis item and (ii) to switch to the next fault diagnosis item, thereby enabling an increase of the diagnosis rate of the next/other fault diagnosis item.

Further, when the vehicle behavior change occurs, i.e., when the vehicle behavior change is expected/predicted, by the setting of the fault diagnosis detection condition, whether or not to let the vehicle behavior change to occur is determined, with the determination result being fed back to the control. Therefore, even when the vehicle behavior change occurs by performing the failure-diagnosis detection condition setting by the ECU 1, such behavior change is suitably controllable.

Further, the ECU 1 is enabled to prevent the deterioration of the drivability of the vehicle while satisfying the detection condition of the fault diagnosis item that has caused the vehicle behavior change.

Further, even when the subduing of the vehicle behavior change is difficult by the above-described method, the ECU 1 is enabled to set the detection condition of the fault diagnosis item having the next lowest rate achieve ratio while subduing the vehicle behavior change.

The ECU 1 is enabled to perform a determination of whether the subduing the vehicle behavior change is necessary, based on the front reach time, i.e., how much time is left to avoid a collision/contact with the front obstacle, which provides a clue for such determination. The ECU 1 is also enabled to determine whether the vehicle behavior change subduing is necessary based on 1o the front reach time to the right/left turn at the next intersection. The ECU 1 is also enabled to determine whether the vehicle behavior change subduing is necessary based on the front reach time to the stop sign position. The ECU 1 is also enabled to determine whether the vehicle behavior change subduing is necessary based on the behind reach time to the behind vehicle.

OTHER EMBODIMENTS

The present disclosure is not limited only to the above-described embodiment, and may be applied to various embodiments pertaining to the scope of the inventive idea.

That is, for example, even though the rate achieve ratio in the above embodiment is defined as an index, i.e., a ratio of the current diagnosis rate against the minimum requirement rate by the regulation, the rate achieve ratio may be applicable to other kind of achievement, i.e., for other achievement required rate set by other entity or by the government.

Although the present disclosure has been described in connection with preferred embodiment thereof with reference to the accompanying FIG.s, it is to be noted that various changes and modifications will become apparent to those skilled in the art, and such changes, modifications, and summarized scheme are to be understood as being within the scope of the present disclosure as defined by appended claims.

What is claimed is:

1. An electronic control unit includes:
   a power controller configured to perform an auto-drive via a control of a power source in a vehicle; and
   a calculation processor, wherein
   the calculation processor is configured to:
   (i) obtain current rate information determined as a diagnosis rate of a number of fault diagnoses for fault diagnosis items by a fault diagnosis device against a number of trips of the vehicle,
   (ii) calculate, for the fault diagnosis items, a rate achieve ratio as a ratio of a current diagnosis rate against a preset minimum requirement rate,
   (iii) perform a detection condition setting process that sets control information respectively for the fault diagnosis items, the setting of the control information by the detection condition setting process rearranged in an ascending order of the rate achieve ratios calculated for the fault diagnosis items, the control information being fault diagnosis related, and
   (iv) control the power controller based on the control information.

2. The electronic control unit of claim 1, wherein the calculation processor performs the detection condition setting process until the rate achieve ratio reaches a preset value for each of the fault diagnosis items.

3. The electronic control unit of claim 1, wherein the calculation processor aborts the detection condition setting process for the fault diagnosis item for which a detection condition in an uncontrollable state is not satisfied, and continues to perform the detection condition setting process for the fault diagnosis item having a next lowest rate achieve ratio.

4. The electronic control unit of claim 1 wherein the electronic control unit is configured to:
   monitor a vehicle behavior change when a detection condition is set for the fault diagnosis item, and wherein
   the calculation processor is further configured to perform a vehicle behavior change subdue control for the power controller, when (i) the electronic control unit detects a vehicle behavior change that is equal to or greater than a predetermined threshold value, and (ii) the vehicle behavior change subdue control for the vehicle behavior change is determined as required.

5. The electronic control unit of claim 4, wherein the calculation processor performs the vehicle behavior change subdue control within a detection condition range of a subject fault diagnosis item.

6. The electronic control unit of claim 4, wherein the calculation processor is further configured to perform, as the vehicle behavior change subdue control, the detection condition setting process of the fault diagnosis item having the next lowest rate achieve ratio, after aborting the detection condition setting process of a current fault diagnosis item.

7. The electronic control unit of claim 4, wherein the electronic control unit is further configured to:
   obtain, from outside of the vehicle, distance information regarding a distance to a front obstacle in front of the vehicle,
   calculate an anticipated reach time to the obstacle based on the currently-obtained distance information, and the previously-obtained distance information, and
   determine that the vehicle behavior change subdue control is required, when the anticipated reach time from the above calculation is equal to or less than a preset value.

8. The electronic control unit of claim 4, wherein the electronic control unit is further configured to:
   obtain, from outside of the vehicle, distance information regarding a distance to a curved road in front of the vehicle,
   calculate an anticipated reach time to the curved road based on the currently-obtained distance information, and the distance information obtained in the past, and
   determine that the vehicle behavior change subdue control is required, when the anticipated reach time from the above calculation is equal to or less than a preset value.

9. The electronic control unit of claim 4, wherein the electronic control unit is further configured to:
   obtain, from outside of the vehicle, distance information regarding a distance to a next right or left turn position in front of the vehicle,
   calculate an anticipated reach time to the next right or left turn position, based on the currently-obtained distance information, and the distance information obtained in the past, and
   determine that the vehicle behavior change subdue control is required, when the anticipated reach time from the above calculation is equal to or less than a preset value.

10. The electronic control unit of claim 4, wherein the electronic control unit is further configured to:
    obtain, from outside of the vehicle, distance information regarding a distance to a stop sign position in front of the vehicle,
    calculate an anticipated reach time to the stop sign position, based on the currently-obtained distance information, and the previously-obtained distance information, and
    determine that the vehicle behavior change subdue control is required, when the anticipated reach time from the above calculation is equal to or less than a preset value.

11. The electronic control unit of claim 4, wherein the electronic control unit is further configured to:
    obtain, from outside of the vehicle, distance information regarding a distance to a behind vehicle traveling behind,
    calculate an anticipated reach time of the behind vehicle based on the currently-obtained distance information and the previously-obtained distance information, and
    determine that the vehicle behavior change subdue control is required, when the anticipated reach time from the above calculation is equal to or less than a preset value.

12. A vehicle, comprising:
    a power source; and
    an electronic control unit,
    wherein the electronic control unit includes:
    a power controller configured to perform an auto-drive via a control of a power source in a vehicle; and a calculation processor, wherein
the calculation processor is configured to:
- (i) obtain current rate information determined as a diagnosis rate of a number of fault diagnoses for fault diagnosis items by a fault diagnosis device against a number of trips of the vehicle,
- (ii) calculate, for the fault diagnosis items, a rate achieve ratio as a ratio of a current diagnosis rate against a preset minimum requirement rate,
- (iii) perform a detection condition setting process that sets control information respectively for the fault diagnosis items, the setting of the control information by the detection condition setting process rearranged in an ascending order of the rate achieve ratios calculated for the fault diagnosis items, the control information being fault diagnosis related, and
- (iv) control the power controller based on the control information.

* * * * *